(12) United States Patent
Bedillion et al.

(10) Patent No.: US 7,570,451 B2
(45) Date of Patent: Aug. 4, 2009

(54) SERVO ARCHITECTURE FOR HIGH AREAL DENSITY DATA STORAGE

(75) Inventors: Mark David Bedillion, Allison Park, PA (US); Patrick Breckow Chu, Wexford, PA (US); Xinghui Huang, Pittsburgh, PA (US); Kevin Arthur Gomez, Wexford, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/954,616

(22) Filed: Dec. 12, 2007

(65) Prior Publication Data

US 2009/0154004 A1 Jun. 18, 2009

(51) Int. Cl.
*G11B 5/596* (2006.01)
(52) U.S. Cl. .................. 360/78.05; 360/78.12
(58) Field of Classification Search ............... 360/77.11
See application file for complete search history.

(56) References Cited

U.S. PATENT DOCUMENTS

| | | | | |
|---|---|---|---|---|
| 4,149,198 A | * | 4/1979 | Behr et al. | 360/77.07 |
| 4,616,275 A | * | 10/1986 | Peeters | 360/77.07 |
| 4,814,907 A | | 3/1989 | Goor | |
| 4,954,904 A | | 9/1990 | Goor | |
| 6,028,731 A | * | 2/2000 | Bond | 360/77.11 |
| 6,115,223 A | | 9/2000 | Berg et al. | |

OTHER PUBLICATIONS

Sacks et al., A. H., "MR Head Effects on PES Generation: Simulation and Experiment", IEEE Transactions on Magnetics, vol. 32, No. 3, pp. 1773-1178, May 1996.
Tarnopolsky, G. "Hard Disk Drive Capacity at High Magnetic Areal Density", IEEE Transactions on Magnetics, vol. 40, No. 1, pp. 301-306, Jan. 2004.

* cited by examiner

*Primary Examiner*—Jason C Olson
(74) *Attorney, Agent, or Firm*—Leanne Taveggia Farrell; Westman, Champlin & Kelly, P.A.

(57) ABSTRACT

A track accessing mechanism includes a track accessing arm actuable by a primary actuation device for accessing concentric data tracks on a storage medium and at least one slider attached to the track accessing arm. The at least one slider includes a servo head configured to read positional information from a plurality of continuous, concentric rings radially spaced apart from each other on a storage medium and a data head configured to read and write user data to the least one concentric data track. At least a portion of each ring includes servo information. The at least one data track is positioned between each continuous, concentric ring on the storage medium.

18 Claims, 7 Drawing Sheets

SERVO ARCHITECTURE FOR HIGH AREAL DENSITY DATA STORAGE

BACKGROUND

Data storage devices, such as disc drives, typically store information on surfaces of storage media such as magnetic or optical discs. In a typical disc drive, one or more discs are mounted together on a spindle motor. The spindle causes the disc(s) to spin and the data surfaces of the disc(s) to pass under respective bearing sliders. Each slider is typically mounted on a suspension attached to an actuator arm that moves over each disc surface.

When information is stored on a storage medium, it is generally stored in a set of concentric data tracks. The tracks on the storage medium surface are typically divided into sectors. Sectors are the basic units of data storage on a storage medium surface. A sector is a storage segment along the length of a track. User data are stored in user data sectors, while servo data are stored in servo sectors that are inserted between data sectors along each track. Information that is stored in servo sectors is utilized by a servo system in the data storage device. Conventional servo systems extract head position information from the servo sectors such that the head is positioned at or very close to a track center of a track before user data are written to a data sector or read back from the data sector.

The ever increasing popularity of electronic mobile devices has correspondingly included an increased demand for high capacity data storage devices. Increasing areal densities or increasing data track densities is one way of increasing data storage capacity. To make a higher track density data storage device be affective, the sampling rate of the servo system must be increased, while the sensing noise of the servo system must be decreased. The sampling rate of the servo system is directly related to the amount of user data relative to the amount of servo data. To increase the sampling rate, the number of servo sectors on the storage medium needs to increase. To decrease sensing noise, the size of each servo sector needs to increase. Increasing the number of servo sectors and increasing the size of servo sectors on the storage medium will severely diminish the format efficiency of the data storage device.

SUMMARY

A track accessing mechanism is disclosed that includes a track accessing arm and at least one slider. The track accessing arm is actuable by a primary actuation device for accessing concentric data tracks on a storage medium. The at least one slider is attached to the track accessing arm and includes a servo head and a data head. The servo head is configured to read positional information from a plurality of continuous, concentric rings radially spaced apart from each other on a storage medium. Each ring includes at least a portion of servo information. The data head is configured to read and write user data to the least one concentric data track. The at least one data track is positioned between each continuous, concentric rings on the storage medium.

A method is disclosed for accessing to a track. A primary actuation device is actuated to position a servo head on a first ring of a storage medium. A secondary actuation device is extended to position a data head on a second ring adjacent to the first ring while the primary actuation device maintains the servo head on the first ring. At least a portion of each of the first ring and the second ring includes servo information. The secondary actuation device is contracted while the primary actuation device maintains the data head on the second ring to position the servo head on the second ring.

A storage medium is disclosed that includes a plurality of continuous, concentric rings radially spaced apart from each other and at least one concentric data track positioned between each ring. At least a portion of each ring includes positional information and each data track includes user data.

Other features and benefits that characterize embodiments of the slider will be apparent upon reading the following detailed description and review of the associated drawings.

DETAILED DESCRIPTION

Figure 1:
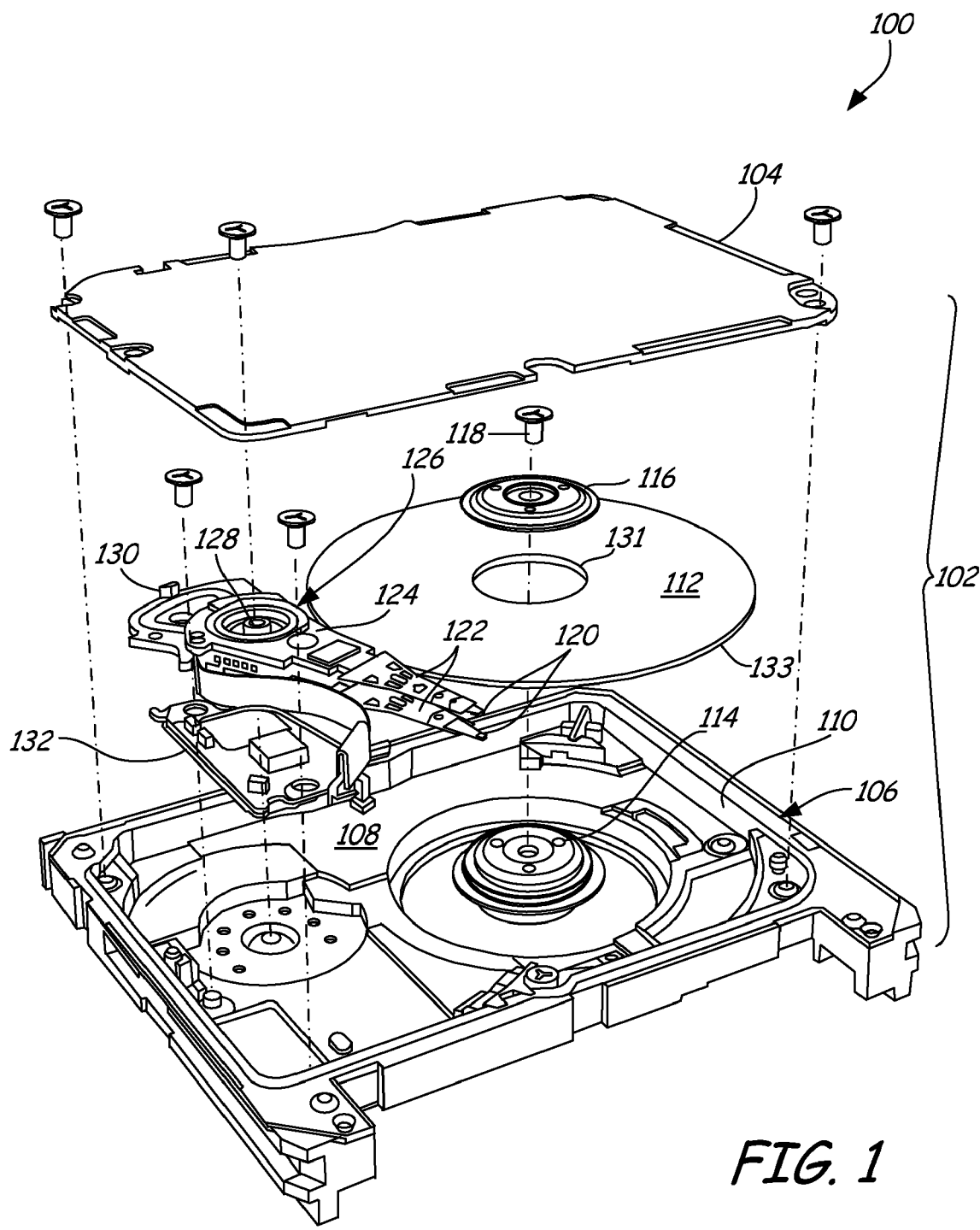
FIG. 1 is an exploded perspective view of a disc drive.

FIG. 1 is an exploded perspective view of a disc drive 100 in which embodiments of the present invention are useful. Disc drives are common data storage systems. One or more embodiments of the present invention are also useful in other types of data storage.

Disc drive 100 includes a housing 102 having a cover 104 and a base 106. As shown, cover 104 attaches to base 106 to form an enclosure 108 enclosed by a perimeter wall 110 of base 106. The components of disc drive 100 are assembled to base 106 and are enclosed in enclosure 108 of housing 102. As shown, disc drive 100 includes a disc or storage medium 112. Although FIG. 1 illustrates storage medium 112 as a single disc, those skilled in the art should understand that more than one disc can be used in disc drive 100. Storage medium 112 stores information in a plurality of concentric data tracks, such as circular or spiral data tracks, and is mounted on a spindle motor assembly 114 by a disc clamp 116 and pin 118. Spindle motor assembly 114 rotates storage medium 112 causing its data surfaces to pass under respective bearing slider surfaces. Each surface of storage medium 112 has at least one associated slider 120, which carries transducers that communicate with the surface of the medium. Typically, a transducer is commonly referred to as a head. For example a transducer that reads information from a storage medium 112 is a read head and a transducer that can write information to a storage medium 112 is a write head. In another example, the read transducer and the write transducer can be referred to as a data head.

In the example shown in FIG. 1, sliders 120 are supported by suspension assemblies 122, which are, in turn, attached to track accessing arms 124 of a track accessing mechanism 126. Track accessing mechanism 126 is actuable about a shaft 128 by a voice coil motor 130, which is controlled by a servo controller within circuit 132. Voice coil motor 130 rotates track accessing mechanism 126 to position sliders 120 relative to desired data tracks, between a disc inner diameter 131 and a disc outer diameter 133. Track accessing mechanism 126 is configured for track seeking and track following.

Figure 2:
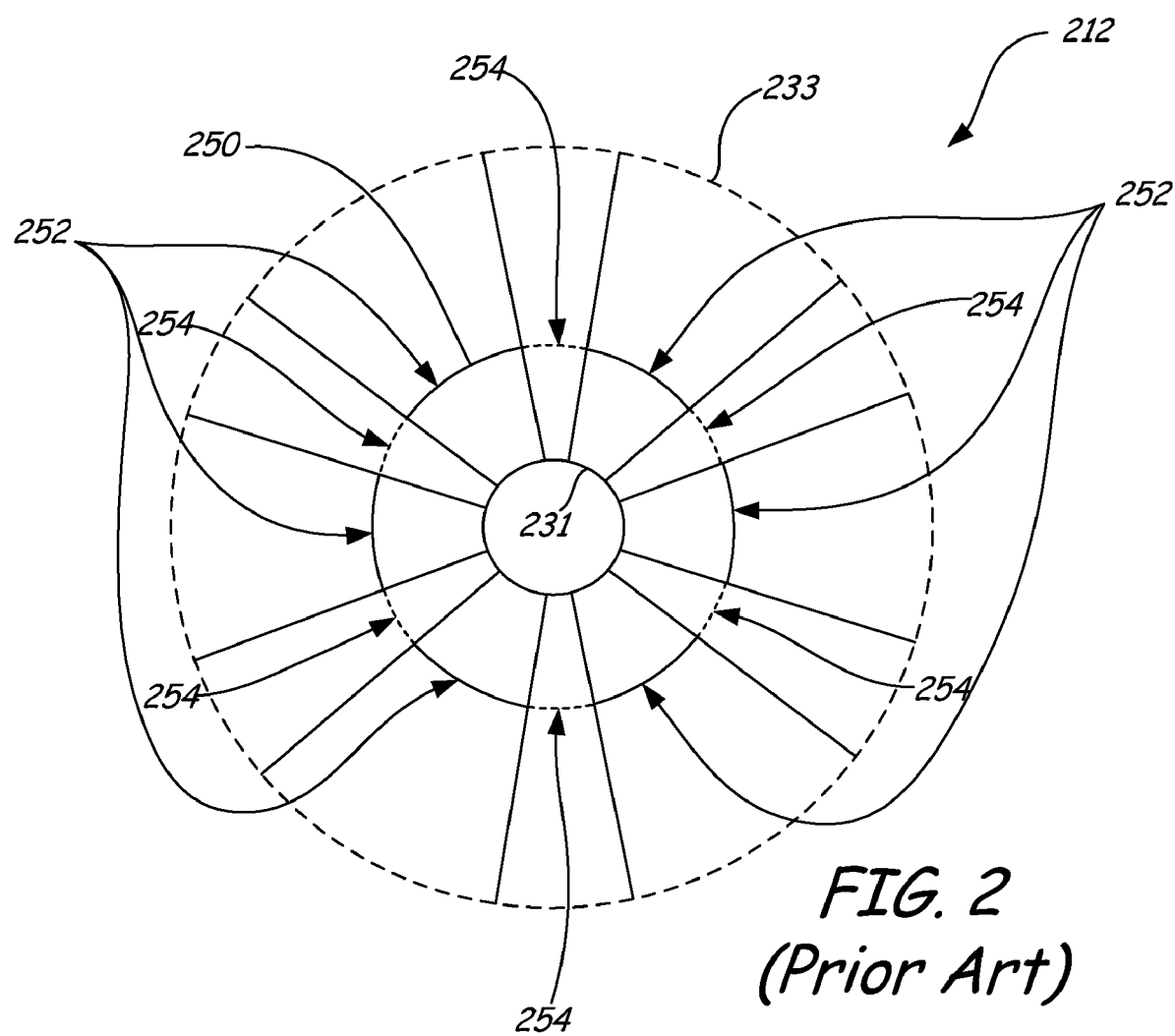
FIG. 2 illustrates a schematic diagram of a storage medium in accordance with the prior art.

FIG. 2 illustrates a schematic diagram of a storage medium 212 in accordance with the prior art. Storage medium 212 has a plurality of concentric data tracks, such as circular or spiral data tracks of which data track 250 is illustrated in FIG. 2. Each track, including data track 250, is subdivided into a plurality of data sectors 252 (illustrated as solid segments of data track 144) and servo sectors 254 (illustrated as dashed segments of data track 144). It should be noted that the size of each data sector 252 and servo sector 254 in FIG. 2 has been greatly exaggerated for visual clarity. Sectors 252 and 254 are the basic unit of data storage in storage medium 212 and are arranged in angular sections that extend radially from a disc inner diameter 231 to a disc outer diameter 233. Each data sector 252 is identified and located at various circumferential positions on storage medium 212. Each data sector 252 includes available area for writing user data. Between data sectors 252 are servo sectors 254. Each servo sector 254 includes positioning information that is pre-written onto storage medium 212 such that data can be easily located. Servo sectors 254 contain several pieces of information, such as information identifying the current sector relative to a spindle index; current track identity; and "servo burst information," which gives an accurate measure of the head position relative to the center of the servo sector and the fundamental position sensing resolution in the drive.

Figure 3:
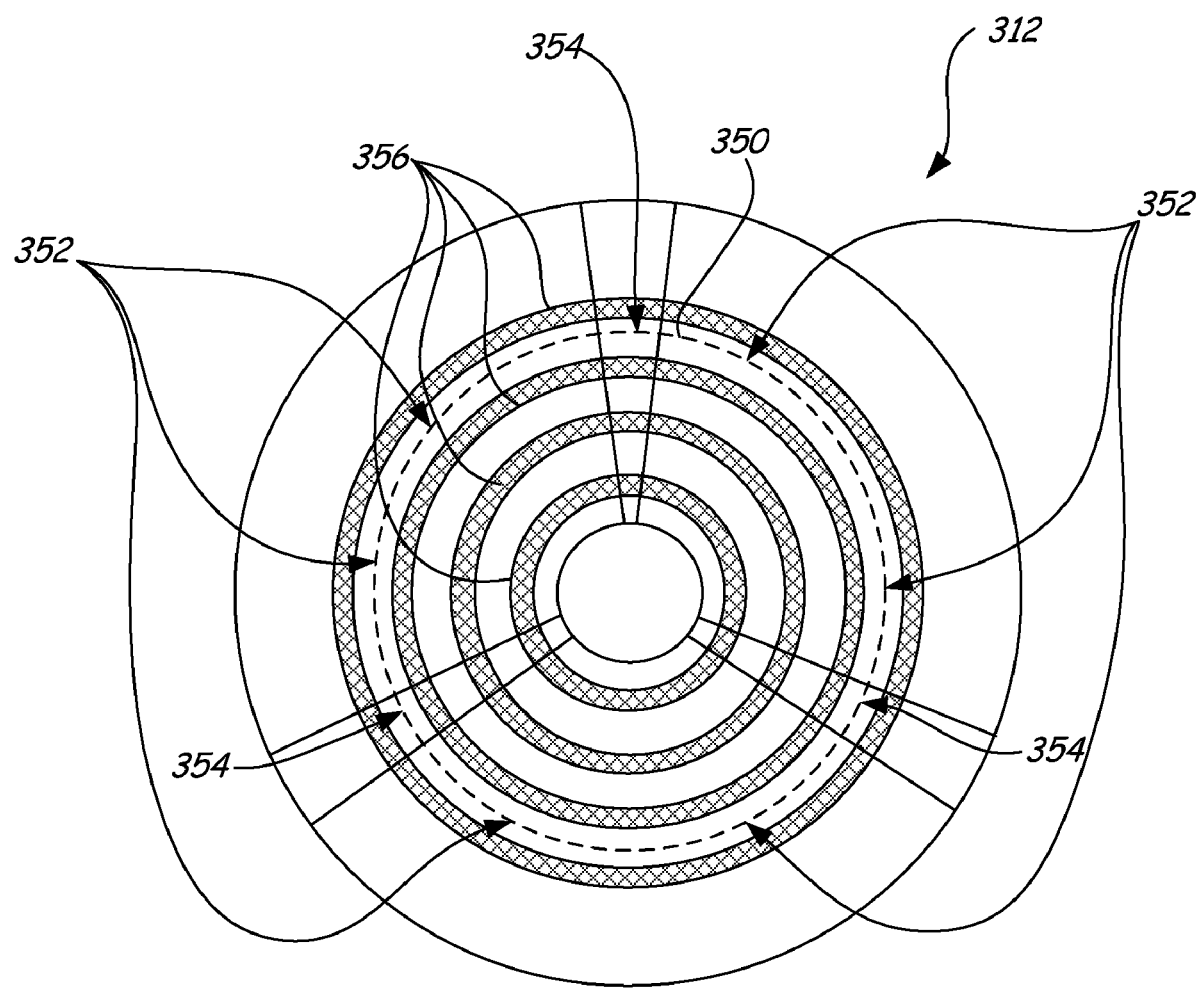
FIG. 3 illustrates a schematic diagram of a storage medium under various embodiments.

FIG. 3 illustrates a schematic diagram of storage medium 312 under one embodiment. Like prior art storage medium 212, storage medium 312 includes a plurality of concentric data tracks, such as circular or spiral data tracks, of which data track 350 is illustrated as a dashed circle in FIG. 3. Unlike prior art storage medium 212, storage medium 312 includes a plurality of rings 356 of which are cross-hatched in FIG. 3. The plurality of rings 356 are radially spaced apart from each other on storage medium 312. At least one data track, such as data track 350, is positioned between each continuous, concentric ring 356. At least a portion of each ring 356 includes positional information. Each ring 356 can also include other kinds of data.

In an alternative embodiment, storage medium 312 can also include a plurality of servo sectors 354 similar to the servo sectors 254 discussed and illustrated in FIG. 2. However, as illustrated in FIG. 3, in one embodiment, servo sectors 354 can have a circumferential frequency about storage medium 312 that is less than the circumferential frequency of servo sectors 254 about storage medium 212. In another embodiment, servo sectors 354 can have less information than servo sectors 254. In such embodiments, servo sectors 354 supplement the positional information stored in the plurality of rings 356 to locate a data track of interest. It should be noted that servo sectors 354 can also have a circumferential frequency about storage medium 312 that is similar to the circumferential frequency of servo sectors 254 as well as have a similar amount of information as servo sectors 354. In such embodiments, sampling rate of storage medium 312 would improve as well as format efficiency. Each servo sector 354 includes positioning information that is pre-written onto storage medium 312, such as track identification information. It should be noted that the size of rings 356, data sectors 352 and servo sectors 354 in FIG. 3 have been greatly exaggerated for visual clarity.

Figure 4:
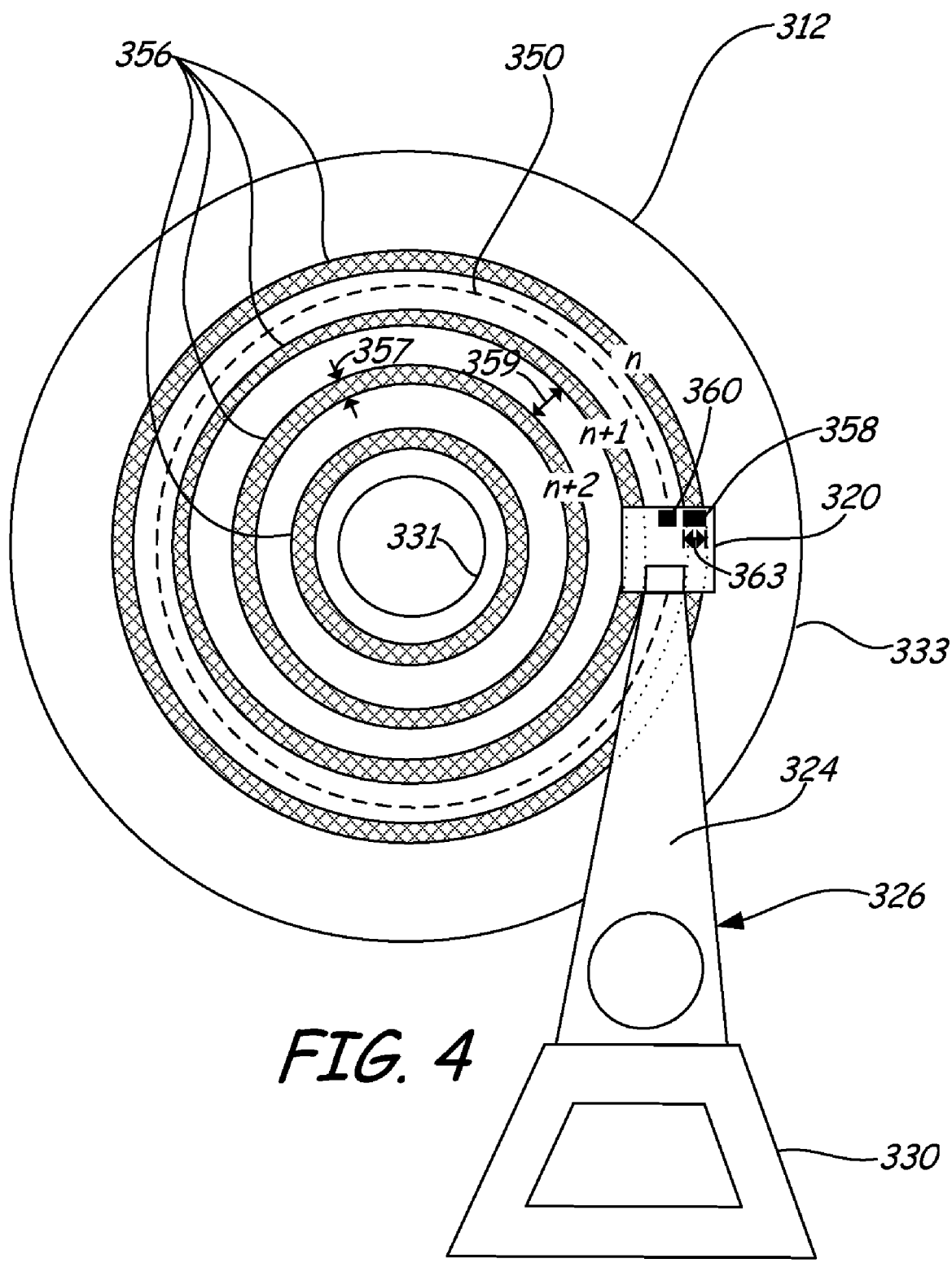
FIG. 4 illustrates a schematic diagram of the storage medium of FIG. 3 and a track accessing mechanism under one embodiment.

FIG. 4 illustrates a schematic diagram of storage medium 312 of FIG. 3 and a track accessing mechanism 326 under one embodiment. Although not shown in FIG. 4, it should be recognized that storage medium 312 can include servo sectors 354 containing track identification information as illustrated in FIG. 3. Track accessing mechanism 326 is configured for track seeking and track following and includes a track accessing arm 324 having a suspension (not particularly illustrated in FIG. 4) actuable by a primary actuation device or voicecoil motor 330 for accessing concentric data tracks, such as data track 350. Track accessing arm 324 is actuable or rotatable between a storage medium inner diameter 331 and a storage medium outer diameter 333. Track accessing mechanism 326 also includes a slider 320 attached to track accessing arm 324 via the suspension. Slider 320 includes a servo head 358 and a data head 360. As previously discussed, data head 360 includes a read transducer and/or a write transducer for reading and writing user data from or to data tracks 350. Servo head 358 includes a read transducer for reading servo information or positional information from rings 356. Unlike prior art storage mediums that include servo burst information, storage medium 312 includes servo information located in at least a portion of rings 356 such that servo head 358 can read servo information continuously. Although not particularly illustrated in FIG. 4, slider 320 includes a secondary actuation device or microactuator to locate data head 360 relative to servo head 358.

Figure 5A:
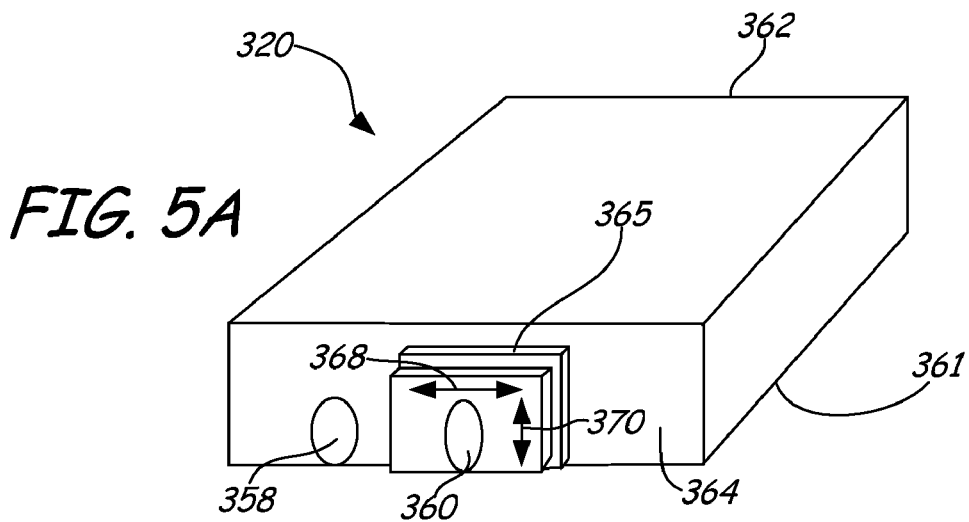
FIGS. 5A-5C illustrate perspective views of various different configurations of a slider of the track accessing mechanism of FIG. 4 under different embodiments.
Figure 5B:
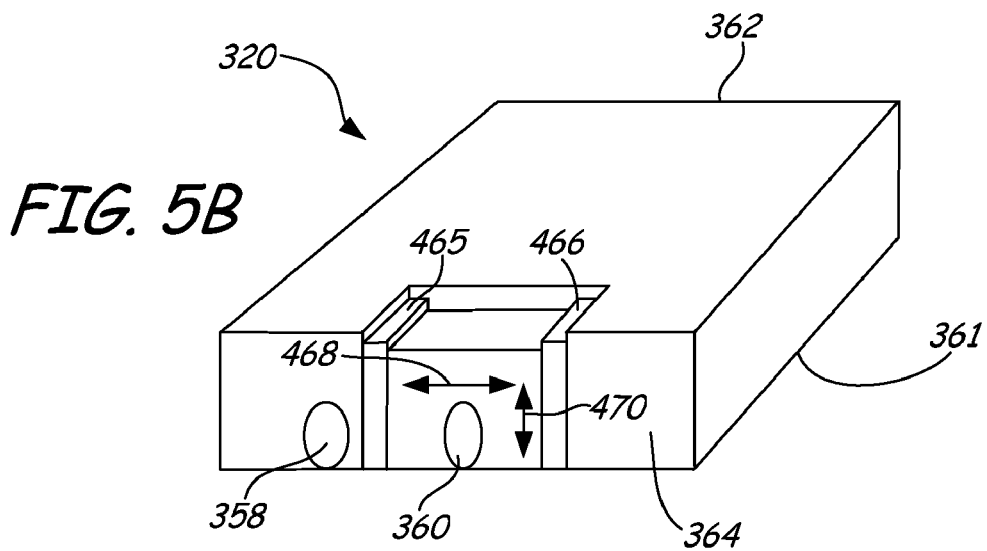
Figure 5C:
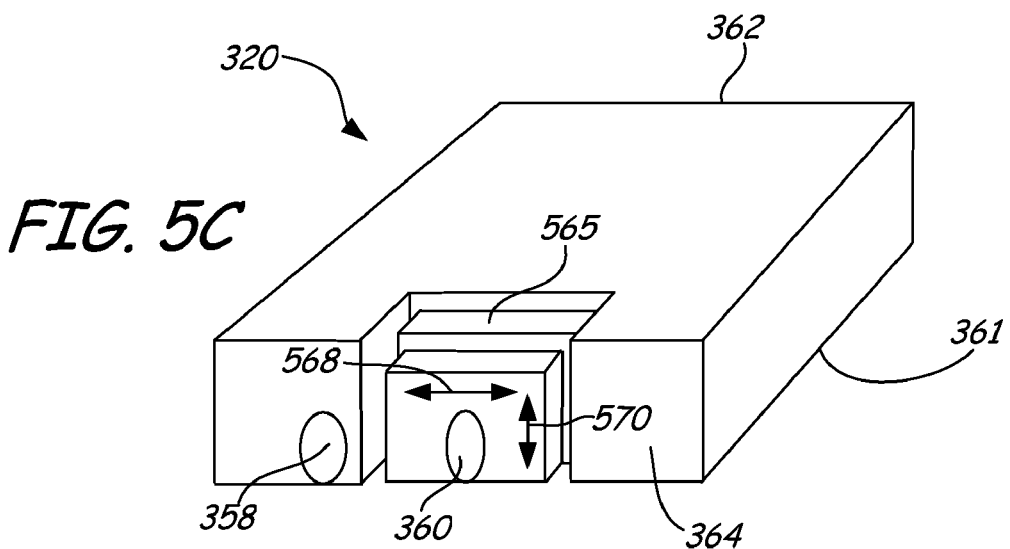

As illustrated in perspective views in FIGS. 5A-5C, slider 320 of FIG. 4 includes one of a variety of different secondary actuation device configurations. In FIGS. 5A-5C, slider 320 includes an air bearing surface 361, a leading edge 362 and a trailing edge 364. As also illustrated in the embodiments in FIGS. 5A-5C, slider 320 includes servo head 358 and read head 360, which are both located at or near trailing edge 364. Slider 320 includes a secondary actuation device or microactuator 365 positioned on trailing edge 364 between data head 360 and trailing edge 364. As illustrated, microactuator 365 is actuable in a cross data track stroke as indicated by line 368. In another embodiment, microactuator 365 can also be actuable towards and away from a storage medium as indicated by line 370. In the cross data track stroke, microactuator 365 extends away from servo head 358 and contracts towards servo head 358. In one embodiment, microactuator 365 can include an integrally formed relative position sensor. The relative position sensor is used to locate data head 360 to a data track of interest on a storage medium, such as data track 350 of storage medium 312. Track following can therefore be accomplished using a combination of the dedicated servo head 358 and the relative position sensor formed integrally with microactuator 365.

In the embodiment illustrated in FIG. 5B, slider 320 includes a pair of secondary actuation devices or a pair of microactuators 465 and 466. In FIG. 5B, first microactuator 465 is positioned between servo head 358 and data head 360 and second microactuator 466 is positioned on the opposite side of data head 360 such that data head 360 is positioned between the pair of microactuators 465 and 466. As illustrated, the pair of microactuators 465 and 466 cooperate to actuate data head 360 in a cross data track stroke as indicated by line 468. In another embodiment, microactuators 465 and 466 can also cooperate to actuate towards and away from a storage medium as indicated by line 470. In the cross data track stroke, first microactuator 465 contracts towards servo head 358 while second microactuator 466 extends towards servo head 358 and first microactuator 465 extends towards data head 360 while second microactuator 466 contracts away from data head 360. In one embodiment, microactuators 465 and 466 can include an integrally formed relative position sensor. The relative position sensor is used to locate data head 360 to a data track of interest on a storage medium, such as data track 350 of storage medium 312. Track following can therefore be accomplished using a combination of the dedicated servo head 358 and the relative position sensor formed integrally with microactuators 465 and 466.

In the embodiment illustrated in FIG. 5C, slider 320 includes a secondary actuation device or microactuator 565. In FIG. 5C, microactuator 565 is positioned behind a data head 360 and between a trailing edge 364 and a leading edge 362. As illustrated, microactuator 565 is actuable in a cross data track stroke as indicated by line 568. In an another embodiment, microactuator 365 can be actuable towards and away from a storage medium as indicated by line 570. In the cross data track stroke, microactuator 565 extends away from servo head 358 and contracts towards servo head 358. In one embodiment, microactuator 565 can include an integrally formed relative position sensor. The relative position sensor is used to locate data head 360 to a data track of interest on a storage medium, such as data track 350 of storage medium 312. Track following can therefore be accomplished using a combination of the dedicated servo head 358 and the relative position sensor formed integrally with microactuator 565.

Referring back to FIG. 4, a width 363 of servo head 358 can be wider than data head 360. Further, a width 357 of a ring 356 can be significantly wider than that of data track 350. A wider ring 356 can compensate for skew effects due to position offset between servo head 358 and data head 360. In addition, while FIG. 4 illustrates rings 356 as having a constant width 357, it should be noted that rings 356 need not have a constant width or constant pitch. A distance 359 between rings 356 is no greater than a distance of the cross-track stroke or extension and contraction of microactuator 365. Therefore, all data tracks positioned between rings 365 are accessible by data head 360.

Figure 6:
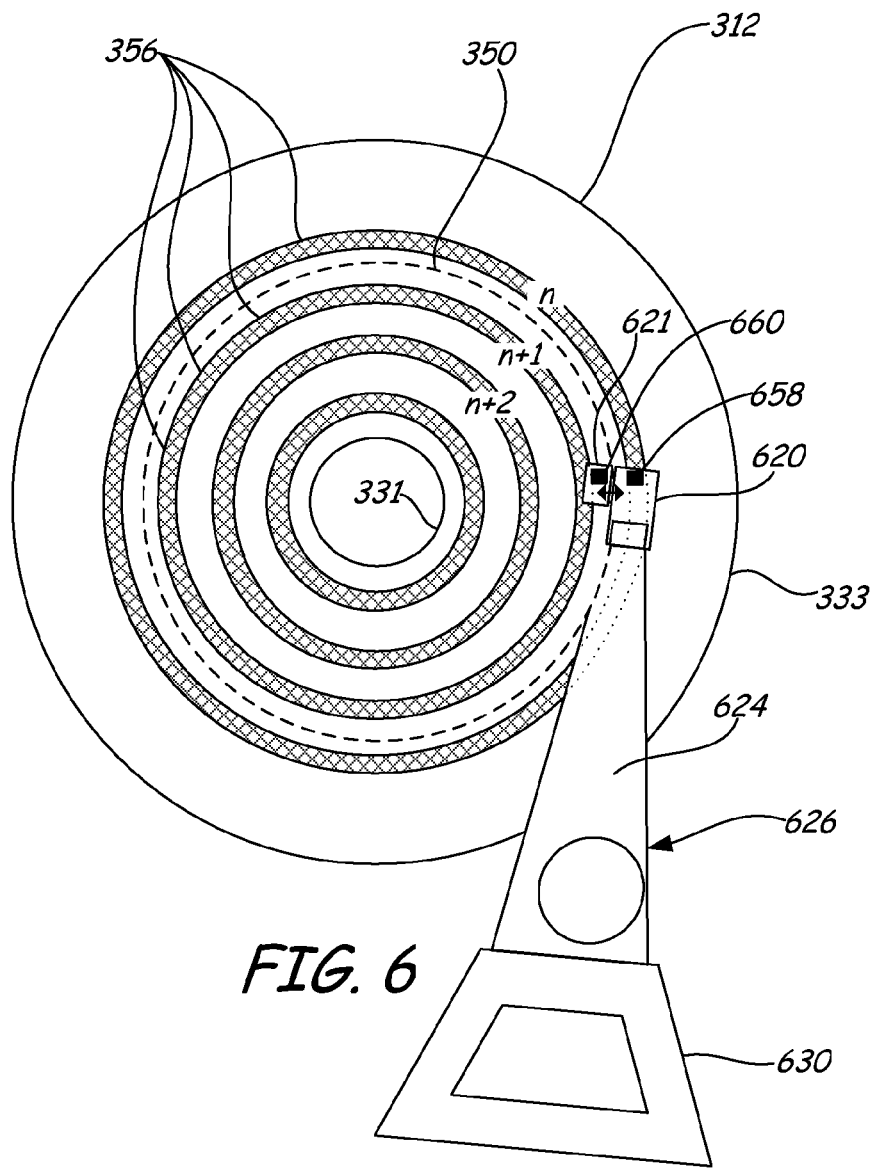
FIG. 6 illustrates a schematic diagram of the storage medium of FIG. 3 and a track accessing mechanism under another embodiment.

FIG. 6 illustrates a schematic diagram of storage medium 312 of FIG. 3 and a track accessing mechanism 626 under another embodiment. Although not shown in FIG. 6, it should be recognized that storage medium 112 can include servo sectors 354 containing track identification information as illustrated in FIG. 3. Track accessing mechanism 626 includes a track accessing arm 624 actuable by a primary actuation device or voicecoil motor 630 for accessing concentric data tracks, such as data track 350. Track accessing arm 624 is actuable or rotatable between storage medium inner diameter 331 and storage medium outer diameter 333. Track accessing mechanism 626 also includes a pair of sliders 620 and 621 attached to track accessing arm 624. First slider 620 includes a servo head 658 and second slider 621 includes a data head 660. As previously discussed, a data head 660 includes a read transducer and/or a write transducer for reading and writing user data from or to data tracks 350. Servo head 658 includes a read transducer for reading servo information or positional information from rings 356. Unlike prior art storage mediums that include servo burst information, storage medium 312 includes servo information located in at least portions of rings 356 such that servo head 658 can read servo information continuously. Although not particularly illustrated in FIG. 6, sliders 620 and 621 include a secondary actuation device or microactuator to position data head 660 located in second slider 621 relative to servo head 658 in first slider 620. While FIG. 6 illustrates only a single data head 660, it should be noted that the embodiments as disclosed can be used in alternative slider architectures where there are multiple data heads. In such a case, the multiple data heads can move relative to the servo head independently or as a group.

Figure 7:
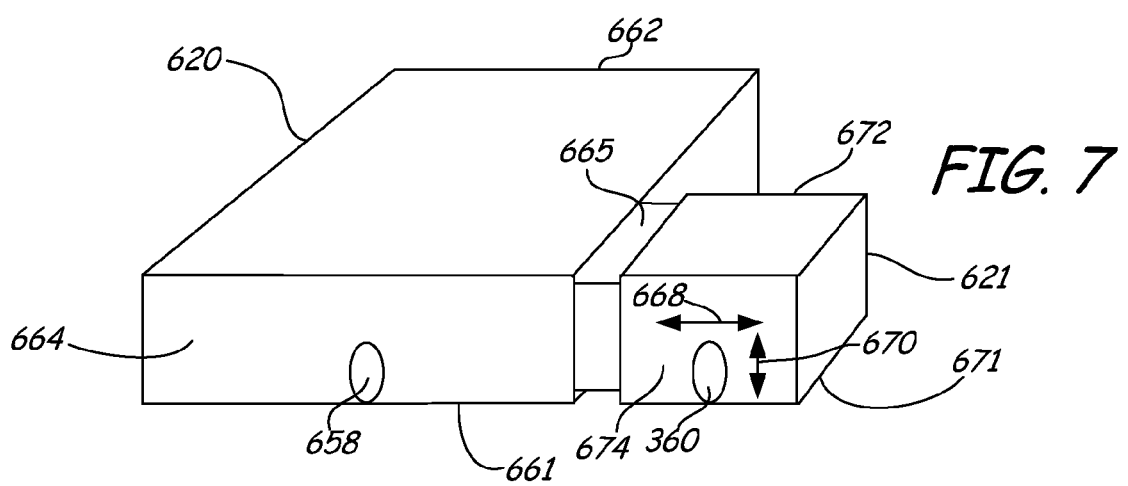
FIG. 7 illustrates a perspective view of a slider of the track accessing mechanism of FIG. 6 under one embodiment.

FIG. 7 illustrates a perspective view of sliders 620 and 621 under one embodiment. First slider 620 includes an air bearing surface 661, a leading edge 662 and a trailing edge 664. First slider 620 also includes servo head 658. Second slider 621 includes surface 671, leading edge 672 and trailing edge 674. Second slider 621 also includes data head 660. Surface 671 can be a surface having or not having an air bearing. Servo head 658 is located at or near trailing edge 664 of first slider 620 and data head 660 is located at or near trailing edge 674 of second slider 621. In the embodiment illustrated in FIG. 7, sliders 620 and 621 include a secondary actuation device or microactuator 665. In FIG. 7, first slider 620 is attached to second slider 621 through microactuator 665. Microactuator 665 is configured to locate data head 660 relative to servo head 658. As illustrated, microactuator 665 is actuable in a cross data track stroke to move data head 660 and second slider 621 as indicated by line 668. In another embodiment, microactuator 665 can be actuable to move data head 660 and second slider 621 towards and away from a storage medium as indicated by line 670. In the cross data track stroke, microactuator 665 extends away from servo head 658 and contracts towards servo head 358. In one embodiment, microactuator 665 can include an integrally formed relative position sensor. The relative position sensor is used to locate data head 660 to a data track of interest on a storage medium, such as data track 350 of storage medium 312. Track following can therefore be accomplished using a combination of the dedicated servo head 658 and the relative position sensor formed integrally with microactuator 665.

With reference to FIGS. 4 and 6, in one embodiment of track seeking, track accessing mechanism 326, 626 moves in an inch worm fashion. To begin with, primary actuation device 330, 630 is actuated to position a servo head 358, 658 on a first ring 356 (n) of a storage medium 312. The storage medium 312, as previously discussed, includes a plurality of circular, concentric rings 356 having positional information that are radially spaced apart from each other and at least one data track 350 positioned between each ring 356. Next, secondary actuation device 365, 665 is extended to position data head 360 on a second ring 356 (n+1) that is adjacent to the first ring 356 (n) while primary actuation device 330, 630 maintains servo head 358, 658 on the first ring 356 (n). Secondary actuation device 365, 665 is then contracted while primary actuation device 330, 630 maintains data head 360, 660 on the second ring 356 (n+1) to position servo head 358, 658 on the second ring 356 (n+1). The steps of extending and contracting secondary actuation device 365, 665 can be repeatedly performed for additional rings (n+2 and so on) until servo head 358, 658 is positioned on a ring 356 that corresponds with a data track of interest.

In another embodiment, to read and/or write information using data head 360, 660 to a data track of interest, data head 360, 660 can utilize the track identification information stored in servo wedges 351 (FIG. 3) on storage medium 312. To read and/or write information, servo head 358, 658 is maintained on the ring 356 that corresponds with the data track of interest using primary actuation device 330, 630. Next, secondary actuation device 365, 665 is extended to position data head 360, 660 on a data track that has a corresponding track identifier as the data track of interest. To perform track following, primary actuation device 330, 630 is maintained on the ring 356 that corresponds with the data track of interest while secondary actuation device 365 is maintained on the data track of interest.

In yet another embodiment, to seek a track, track accessing mechanism 326, 626 can avoid moving in an inch worm fashion by, instead, utilizing the track identification information stored in servo wedges 351 on storage medium 312. Upon seeking to a data track of interest using track identification information, track accessing mechanism 326, 626 can perform track following by maintaining primary actuation device 330, 630 on the ring 356 that corresponds with the data track of interest while maintaining secondary actuation device 365, 665 on the data track of interest.

Figure 8:
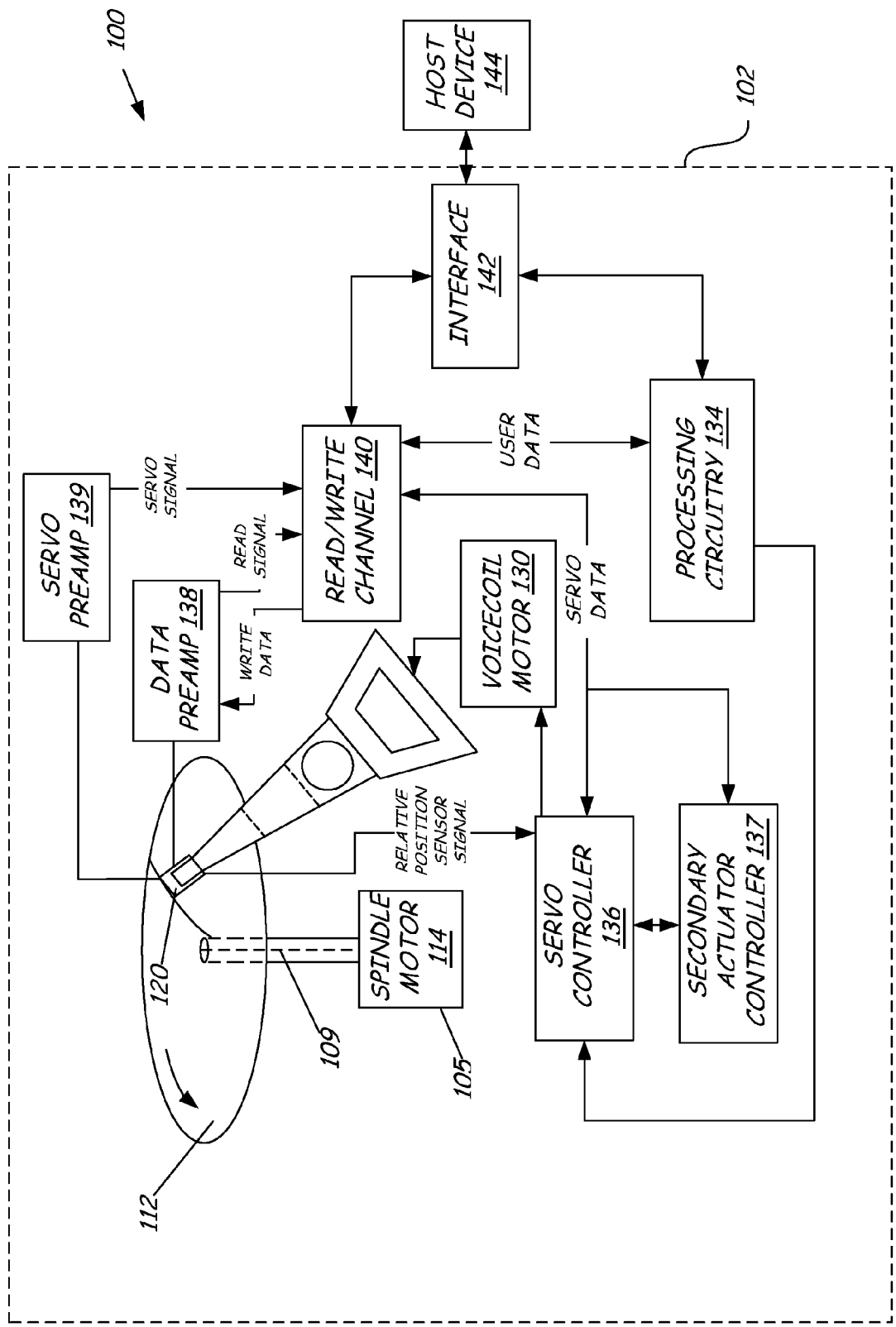
FIG. 8 is a simplified block diagram of the disc drive illustrated in FIG. 1 under one embodiment.

FIG. 8 is a simplified block diagram of disc drive 100, which was illustrated in FIG. 1, having housing 102. Disc drive 100 includes processing circuitry 134, which is used for controlling certain operations of disc drive 100 in a known manner. The various operations of disc drive 100 are controlled by processing circuitry 134 with the use of programming stored in a memory. Disc drive 100 also includes servo controller 136 which generates control signals applied to voicecoil motor 130. Processing circuitry 134 instructs servo controller 136 to seek the at least one slider 120 to desired tracks or circular, concentric rings, such as rings 356 (FIG. 4), on storage medium 112. Servo controller 136 is also responsive to servo data, such as servo burst information recorded on medium 112 in embedded servo wedges, such as servo sectors 354 (FIG. 3).

Disc drive 100 includes a data preamplifier (preamp) 138 for generating a write signal applied to a data head, such as data head 360 (FIG. 4) included in at least one slider 120 during a write operation, and for amplifying a read signal emanating from the data head included in at least one slider 120 during a read operation. Disc drive 100 further includes a servo preamplifier (preamp) 139 for amplifying servo information emanating from a servo head, such as servo head 358 (FIG. 4) included in at least one slider 120. It should be realized that since servo head is reading only servo information from circular, concentric rings on storage medium 112, the servo preamp 139 can be a much more simplified component than that of data preamp 138 since it is unnecessary for servo preamp 139 to operate over the same frequency range as the data preamp 138. In addition, since the servo head is reading only servo information, the servo head passband can be outside of the passband of the data head. In perpendicular recording, transition noise dominates the response and low-frequency tones have higher signal to noise ratios than do high-frequency tones. Therefore, the servo head can be made to operate at a relatively low frequency and therefore have minimal interference with user data.

A read/write channel 140 receives data from processing circuitry 134 during a data head write operation, and provides encoded write data to data preamp 138. During a data head read operation, read/write channel 140 processes a read signal generated by data preamp 138 in order to detect and decode data recorded on medium 112. The decoded data is provided to processing circuitry 134 and ultimately through interface 142 to host device 144. In addition, read/write channel 140 also processes a servo signal generated by servo preamp 139. The servo data resulting from a processed servo signal is fed to servo controller 136 for controlling the position of primary actuation device or voicecoil motor 130 as well as fed to secondary actuator controller 137 for controlling the position of a secondary actuation device, such as microactuator 365 (FIG. 4), included in at least one slider 120. Servo controller 136 and second actuator controller 137 also consider relative position information supplied by a position sensor included with the secondary actuation device when controlling voicecoil motor 130 and the second actuation device.

The range over which accurate tracking of data head 360 (FIG. 4) can be achieved depends on the resolution of the position sensor located in secondary actuation device, such as secondary actuation device 365 (FIG. 4). Embodiments discussed in this disclosure assume that the relative position sensor is DC accurate. If such an assumption is not the case, one or more servo sectors, such as sectors 354 (FIG. 3), can be used to calibrate the low-frequency sensor information. In addition, a width, such as width 357 (FIG. 4), of the rings, such as rings 356 (FIG. 4), depends on the positioning accuracy of a servo head, such as servo head 358 (FIG. 4). In a storage medium having a servo architecture including rings, positioning of servo head 358 is not critical since the known error in the servo head position can be fed into a relative position loop of second actuator controller 137. However, the larger the position error of servo head 358, the wider each ring 356 must be to guarantee an uninterrupted position error signal. To use narrow rings, to compensate for certain large disturbances not correctable with the microactuator included in the slider, and/or to meet other higher bandwidth stroke needs not met by the voicecoil motor, in an alternative embodiment, a microactuated suspension can be used. For example, suspension 122 (FIG. 1) can include a secondary actuation device or microactuator that is actuable in a cross data track stroke to locate a data head relative to a servo head.

Embodiments of the disclosure decouple format efficiency decreases from sensing noise reduction and sampling rate increases such that format efficiency is not diminished. Embodiments of the disclosure provide that a stroke of a secondary actuation device located in a slider, resolution of a position sensor located in the secondary actuation device and track following error of a servo head determine format efficiency regardless of position error signal noise and servo sampling rate.

It is to be understood that even though numerous characteristics and advantages of various embodiments of the invention have been set forth in the foregoing description, together with details of the structure and function of various embodiments, this disclosure is illustrative only, and changes may be made in detail, especially in matters of structure and arrangement of parts within the principles of the disclosure to the full extent indicated by the broad general meaning of the terms in which the appended claims are expressed. For example, the particular elements may vary depending on the type of construction of a track accessing mechanism while maintaining substantially the same functionality without departing from the scope and spirit of the present invention. In addition, although the preferred embodiment described herein is directed to a track accessing mechanism for a disc drive, it will be appreciated by those skilled in the art that the teachings of the present invention can be applied to other types of track accessing mechanisms, without departing from the scope and spirit of the present invention.

What is claimed is:

1. A track accessing mechanism comprising:
   a track accessing arm actuable by a primary actuation device for accessing concentric data tracks on a storage medium;
   at least one slider attached to the track accessing arm, the at least one slider comprising:
      a servo head configured to read positional information from a plurality of continuous, concentric rings radially spaced apart from each other on a storage medium, at least a portion of each ring including servo information;
      a data head configured to read and write user data to the least one concentric data track, the at least one data track positioned between each continuous, concentric ring on the storage medium; and
   at least one secondary actuation device configured to locate the data head relative to the servo head.

2. The track accessing mechanism of claim 1, wherein the continuous, concentric rings are spaced apart from each other by a distance no greater than a distance with which the secondary actuation device extends.

3. The track accessing mechanism of claim 1, wherein the at least one slider comprises a first slider and a second slider, wherein the first slider includes the servo head and the second slider includes the data head.

4. The track accessing mechanism of claim 3, wherein the at least one secondary actuation device is positioned between the first slider and the second slider.

5. The track accessing mechanism of claim 1, wherein the at least one secondary actuation device is positioned on a trailing edge of the at least one slider between the data head and the trailing edge.

6. The track accessing mechanism of claim 1, wherein the at least one secondary actuation device comprises first and second secondary actuation devices, wherein the data head is positioned between the first and second secondary actuation devices.

7. The track accessing mechanism of claim 1, wherein the at least one secondary actuation device is positioned between a trailing edge and a leading edge of the at least one slider.

8. The track accessing mechanism of claim 1, further comprising a suspension attaching the at least one slider to the track accessing arm, the suspension including the at least one secondary actuation device.

9. A method of accessing a track comprising:
actuating a primary actuation device to position a servo head on a first ring of a storage medium, wherein the storage medium includes a plurality of continuous, concentric rings that are radially spaced apart from each other and at least one data track positioned between each ring, at least a portion of each ring including servo information;
extending a secondary actuation device to position a data head on a second ring adjacent to the first ring while the primary actuation device maintains the servo head on the first ring; and
contracting the secondary actuation device while the primary actuation device maintains the data head on the second ring to position the servo head on the second ring.

10. The method of claim 9, further comprising performing the steps of extending the second actuation device and contracting the second actuation device until the servo head is positioned on a ring that corresponds with a data track of interest.

11. The method of claim 10, further comprising:
maintaining the servo head on the ring that corresponds with the data track of interest using the primary actuation device;
extending the secondary actuation device to position the data head on the data track of interest using servo information located in a plurality of servo sectors dispersed between user data on the data track; and
maintaining the secondary actuation device on the data track of interest such that the data head can read and/or write information to the data track of interest.

12. The method of claim 9, further comprising compensating for position error in the primary actuation device using position error information from the servo head.

13. The method of claim 9, further comprising detecting a relative motion of the servo head and the data head using a relative position sensor located in the secondary actuation device.

14. The method of claim 13, further comprising compensating for low-frequency drift in the relative position sensor using servo information located in the plurality of servo sectors dispersed between user data on the data track and servo information located in the continuous, concentric rings.

15. A track accessing mechanism comprising:
a track accessing arm actuable by a primary actuation device for accessing concentric data tracks on a storage medium, the track accessing arm comprising;
first and second sliders spaced apart from each other and moveable relative to each other and at least one of the first and second sliders being attached to the track accessing arm, the first slider including a servo head configured to read positional information from a plurality of continuous, concentric rings radially spaced apart from each other on a storage medium of which at least a portion of each ring includes servo information, the second slider including a data head configured to read and write user data to the least one concentric data track which is positioned between continuous, concentric rings on the storage medium.

16. The track accessing mechanism of claim 15, further comprising at least one secondary actuation device configured to locate the second slider relative to the first slider.

17. The track accessing mechanism of claim 16, wherein the at least one secondary actuation device is positioned between the first slider and the second slider.

18. The track accessing mechanism of claim 16, further comprising a suspension attaching at least one of the first and second sliders to the track accessing arm, the suspension including the at least one secondary actuation device.

* * * * *